United States Patent
Hwang et al.

(10) Patent No.: US 10,321,335 B2
(45) Date of Patent: Jun. 11, 2019

(54) METHOD AND USER EQUIPMENT FOR SWITCHING TO DUAL CONNECTIVITY IN CARRIER AGGREGATION

(71) Applicant: LG ELECTRONICS INC., Seoul (KR)

(72) Inventors: Daesung Hwang, Seoul (KR); Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,843

(22) PCT Filed: Jun. 11, 2015

(86) PCT No.: PCT/KR2015/005876
§ 371 (c)(1),
(2) Date: Dec. 9, 2016

(87) PCT Pub. No.: WO2015/190842
PCT Pub. Date: Dec. 17, 2015

(65) Prior Publication Data
US 2017/0118658 A1    Apr. 27, 2017

Related U.S. Application Data

(60) Provisional application No. 62/011,055, filed on Jun. 12, 2014.

(51) Int. Cl.
*H04W 16/32* (2009.01)
*H04W 72/08* (2009.01)
(Continued)

(52) U.S. Cl.
CPC ............. *H04W 16/32* (2013.01); *H04L 41/08* (2013.01); *H04W 72/085* (2013.01);
(Continued)

(58) Field of Classification Search
CPC .......................... H04W 16/32; H04W 72/085; H04W 88/02; H04W 88/06; H04L 41/08
See application file for complete search history.

(56) References Cited

U.S. PATENT DOCUMENTS

| 2003/0005147 A1 | 1/2003 | Enns et al. |
| 2014/0086127 A1* | 3/2014 | Kim ........................ H04L 5/001 370/311 |

(Continued)

FOREIGN PATENT DOCUMENTS

| CN | 102960022 A | 3/2013 |
| WO | WO 2013/113390 A1 | 8/2013 |

OTHER PUBLICATIONS

3rd Generation Partnership Project; Technical Specification Group Radio Access Network; Evolved Universal Terrestrial Radio Access (E-UTRA); Physical Channels and Modulation (Release 10), 3GPP TS 36.211 V10.4.0 (Dec. 2011), total 101 pages.

(Continued)

*Primary Examiner* — Jenee Holland
(74) *Attorney, Agent, or Firm* — Birch, Stewart, Kolasch & Birch, LLP

(57) ABSTRACT

A method and user equipment (UE) are provided for switching to dual connectivity in carrier aggregation. The UE applies configuration information to a second cell which is configured by a first cell for a carrier aggregation, and receives, from a base station, a message including a request for switching the second cell from the carrier aggregation to dual connectivity. The UE performs a procedure for the switching of the second cell from the carrier aggregation to the dual connectivity. The second cell becomes a primary secondary cell or a secondary cell of a secondary cell group (SCG). The UE transmits a physical uplink control channel (PUCCH) to the primary secondary cell or the secondary (Continued)

cell of the SCG after the switching of the second cell from the carrier aggregation to the dual connectivity.

6 Claims, 12 Drawing Sheets

(51) Int. Cl.
*H04L 12/24* (2006.01)
*H04W 76/10* (2018.01)
*H04W 88/02* (2009.01)
*H04W 88/06* (2009.01)

(52) U.S. Cl.
CPC .......... *H04W 76/10* (2018.02); *H04W 88/02* (2013.01); *H04W 88/06* (2013.01)

(56) References Cited

U.S. PATENT DOCUMENTS

| | | | | |
|---|---|---|---|---|
| 2014/0092785 | A1* | 4/2014 | Song | H04L 1/00 370/280 |
| 2014/0335869 | A1* | 11/2014 | Choi | H04W 36/0072 455/438 |
| 2014/0335882 | A1* | 11/2014 | Lee | H04W 76/025 455/452.2 |
| 2015/0215929 | A1* | 7/2015 | Damnjanovic | H04L 5/001 370/241 |
| 2015/0215945 | A1* | 7/2015 | Hsu | H04L 47/21 370/254 |
| 2015/0245307 | A1* | 8/2015 | Chen | H04W 56/0045 370/336 |
| 2015/0271761 | A1* | 9/2015 | Park | H04W 52/146 370/329 |
| 2015/0271836 | A1* | 9/2015 | Damnjanovic | H04W 72/0413 370/329 |
| 2015/0304875 | A1* | 10/2015 | Axmon | H04W 24/10 370/328 |
| 2015/0365831 | A1* | 12/2015 | Ko | H04L 5/001 370/329 |
| 2016/0174170 | A1* | 6/2016 | Yang | H04W 36/22 370/329 |
| 2016/0242064 | A1* | 8/2016 | Lee | H04W 24/10 |
| 2017/0142707 | A1* | 5/2017 | Zhang | H04W 72/0426 |
| 2017/0238262 | A1* | 8/2017 | Park | H04W 52/146 455/522 |

OTHER PUBLICATIONS

3rd Generation Partnership Project; Technical Specification Group Radio Access Network; Study on Small Cell enhancements for E-UTRA and E-UTRAN; Higher layer aspects (Release 12), 3GPP TR 36.842 V12.0.0 (Dec. 2013), Jan. 7, 2014, total 73 pages.

Huawei, HiSilicon, "Extending PUCCH on PCell and pSCell to Carrier Aggregation", R1-142337, 3GPP TSG RAN WG1 Meeting #77, Seoul, Korea, May 19-23, 2014, total 7 pages.

LG Electronics, "Remaining RAN1 issues of dual connectivity", R1-142143, 3GPP TSG RAN WG1 Meeting #77, Seoul, Korea, May 19-May 23, 2014, total 8 pages.

Pantech, "Reestablishment in dual connectivity", R2-142301, 3GPP TSG-RAN WG2 Meeting #86, Seoul, South Korea, May 19-23, 2014, total 7 pages.

Samsung, "Discussion on small cell on/off scenarios and procedures", R1-141287, 3GPP TSG-RAN WG1#76bis, Shenzhen, China, Mar. 31-Apr. 4, 2014, total 15 pages.

Huawei et al. "Consideration on system information change for Dual connectivity," 3GPP TSG-RAN WG2 Metting #86, R2-142084, Seoul, Korea, May 19-23, 2014, XP050818744, pp. 1-2.

Huawei et al., "pSCell related functionalities and procedures," 3GPP TSG-RAN WG2 Meeting #86, R2-142027, Seoul, South Korea, May 19-23, 2014, XP050793269, 4 pages.

Huawei et al., "Special SCell in dual connectivity," 3GPP TSG-RAN WG2 Meeting #85bis, R2-141166, Valencia, Spain, Mar. 31-Apr. 4, 2018, XP050792411, 4 pages.

* cited by examiner

METHOD AND USER EQUIPMENT FOR SWITCHING TO DUAL CONNECTIVITY IN CARRIER AGGREGATION

CROSS REFERENCE TO RELATED APPLICATIONS

This application is the National Phase of PCT International Application No. PCT/KR2015/005876, filed on Jun. 11, 2015, which claims priority under 35 U.S.C. 119(e) to U.S. Provisional Application No. 62/011,055, filed on Jun. 12, 2014, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

A carrier aggregation system means aggregating a multiple of component carriers (CCs). The meaning of the existing cell was changed by such a carrier aggregation. According to the carrier aggregation, a cell may mean a combination of a downlink component carrier and an uplink component carrier, or a single downlink component carrier. In the carrier aggregation, a cell may be divided into a primary cell, a secondary cell, and a serving cell.

Meanwhile, in order to process data on the increase, in a next generation mobile communication system, it is expected that a small cell with a small cell coverage diameter is to be added within the coverage of the existing macro cell, and the small cell will process traffic greater than before.

Meanwhile, recently, the technology of enabling dual connectivity to the macro cell and the small cell by a user equipment (UE) is currently studied.

Furthermore, recently, a scheme of applying a dual connectivity technology designed in consideration of base stations at different geographical locations to the carrier aggregation (CA) technology operated by one base station is currently studied. According to this scheme, when the PUCCH resource of a primary cell (PCell) is not sufficient, the whole or partial PUCCH transmission of UEs may be detoured to a specific secondary cell (SCell).

However, a technical ambiguity issue may be generated between the base station and the UE during the time section in which one base station switches to dual connectivity in the carrier aggregation (CA).

SUMMARY OF THE INVENTION

Accordingly, a disclosure of the present specification has been made in an effort to solve the aforementioned problem.

In an aspect, a method of switching to dual connectivity in carrier aggregation by a user equipment is provided. The method includes activating a second cell if a request message for activation of the second cell by the carrier aggregation is received from a first cell of one base station, receiving, from the one base station, a message including a configuration for switching to dual connectivity, and maintaining, without change, and using a configuration used for the second cell by the carrier aggregation after the switching to the dual connectivity.

The configuration used for the second cell by the carrier aggregation may include at least one of a pathloss criterion, a timing criterion, a TA (Timing Advance) command, a TM (Transmission Mode), a PDSCH (Physical Downlink Shared Channel) setting, a CSI (Channel State Information) report setting, a PUSCH (Physical Uplink Shared Channel) setting, and a PRACH (Physical Random Access Channel) setting.

The second cell by the carrier aggregation may be changed to a primary secondary cell of a SCG (Secondary Cell Group) after switched to the dual connectivity.

The second cell by the carrier aggregation may be changed to a secondary cell of the SCG after switched to the dual connectivity.

The configuration used for the second cell by the carrier aggregation may be used for the secondary cell belonging to the SCG of the dual connectivity.

The method may further include deactivating the second cell by the carrier aggregation.

The deactivated cell may be each of all cells which are set by the carrier aggregation except for the first cell.

In another aspect, a user equipment is provided. The user equipment includes a radio frequency (RF) unit and a processor configured to activate a second cell if a request message for activation of the second cell by the carrier aggregation is received from a first cell of one base station through the RF unit, then receive, from the one base station, a message including a configuration for switching to dual connectivity, and maintain, without change, and using a configuration used for the second cell by the carrier aggregation after the switching to the dual connectivity.

According to the present invention, the above-mentioned problem will be solved. More specifically, the technical ambiguity between the UE and the base station when performing a transition from the carrier aggregation (CA) to a dual connectivity will be solved.

DESCRIPTION OF EXEMPLARY EMBODIMENTS

Figure 1:
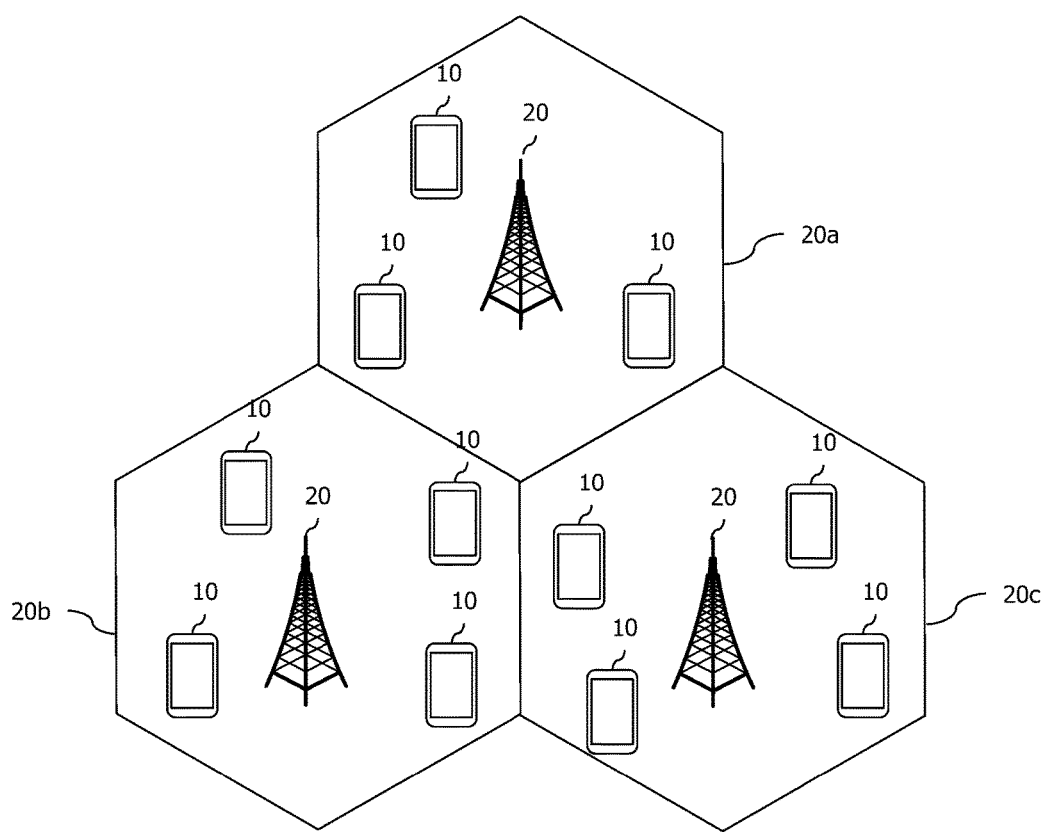
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

Referring to FIG. 1, the wireless communication system includes at least one base station (BS) 20. Respective BSs 20 provide a communication service to particular geographical areas 20*a*, 20*b*, and 20*c* (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
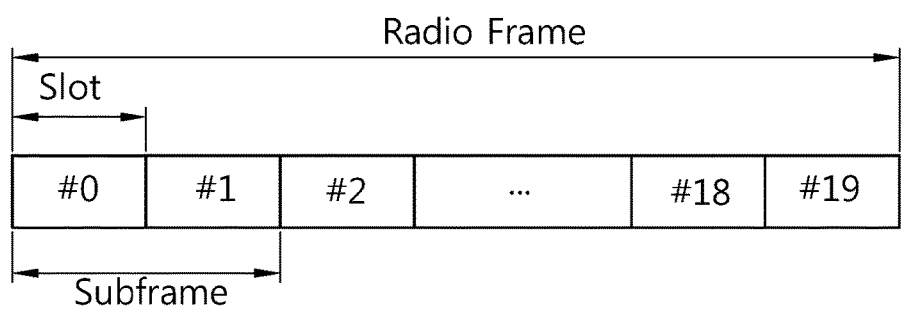
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
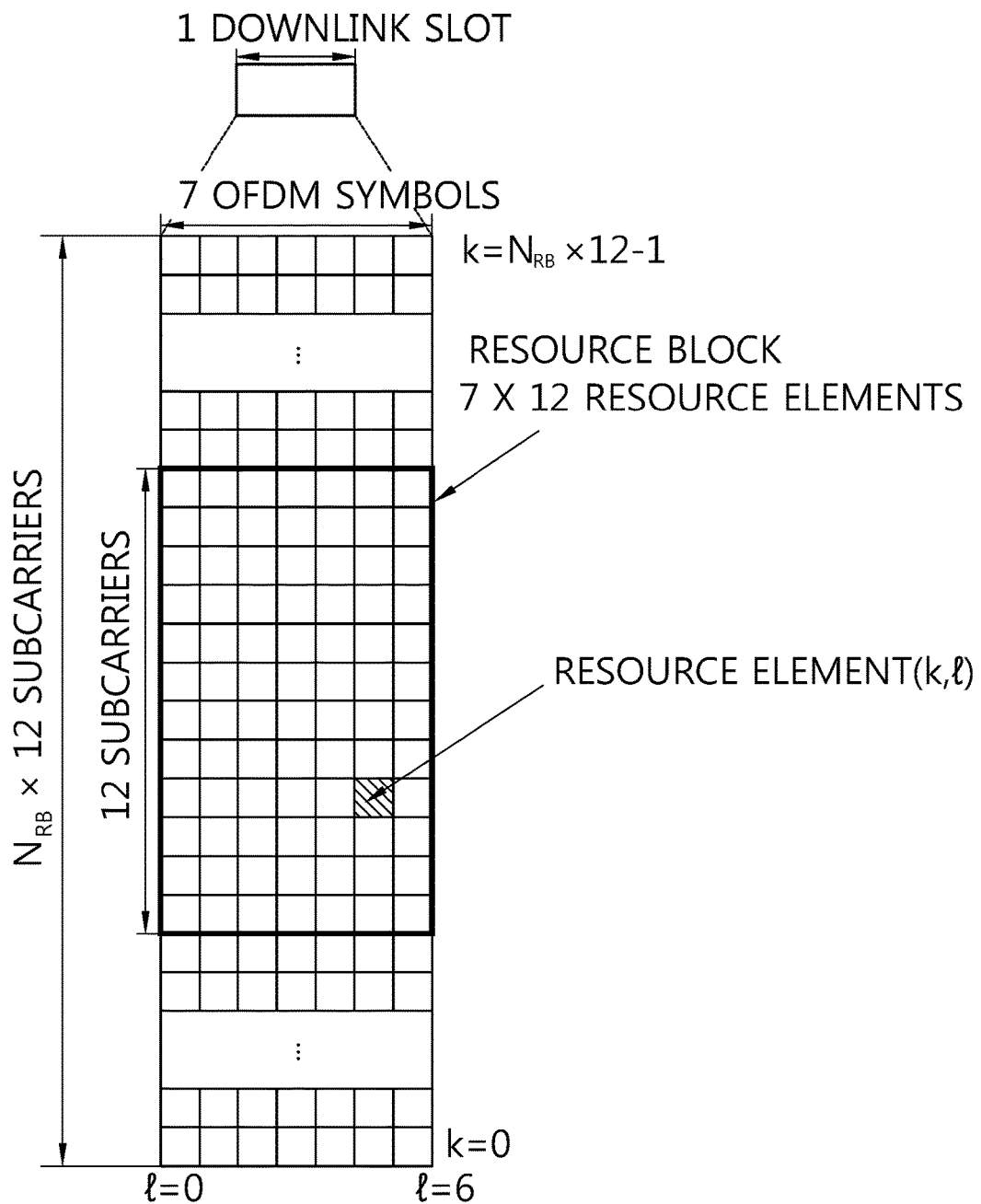
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
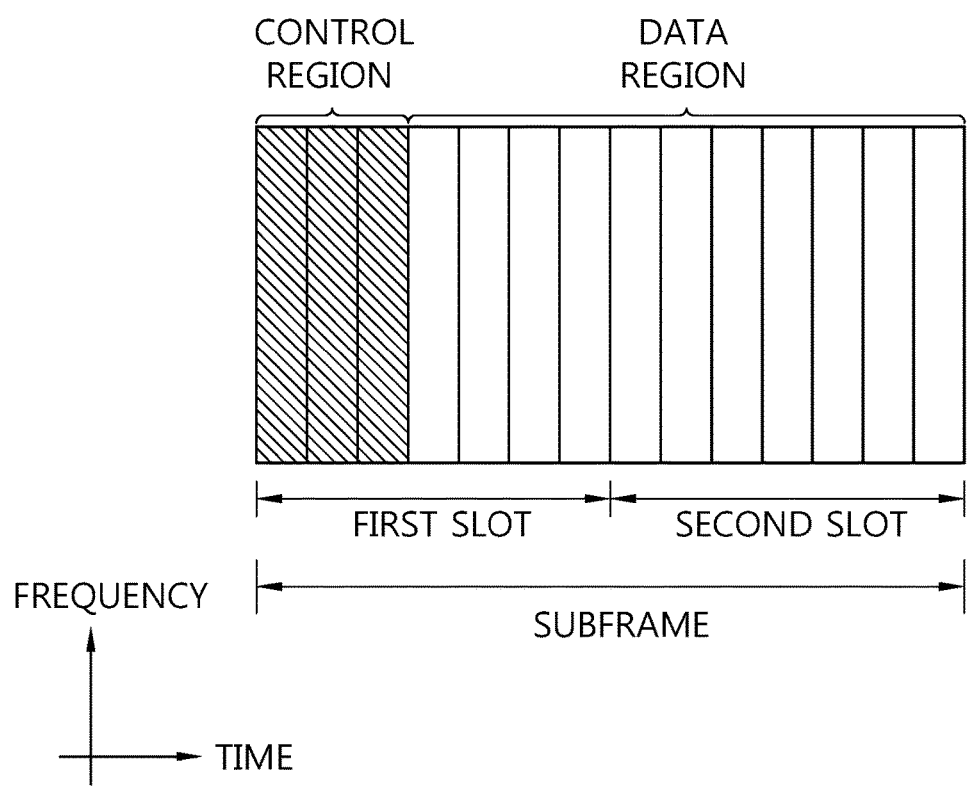
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
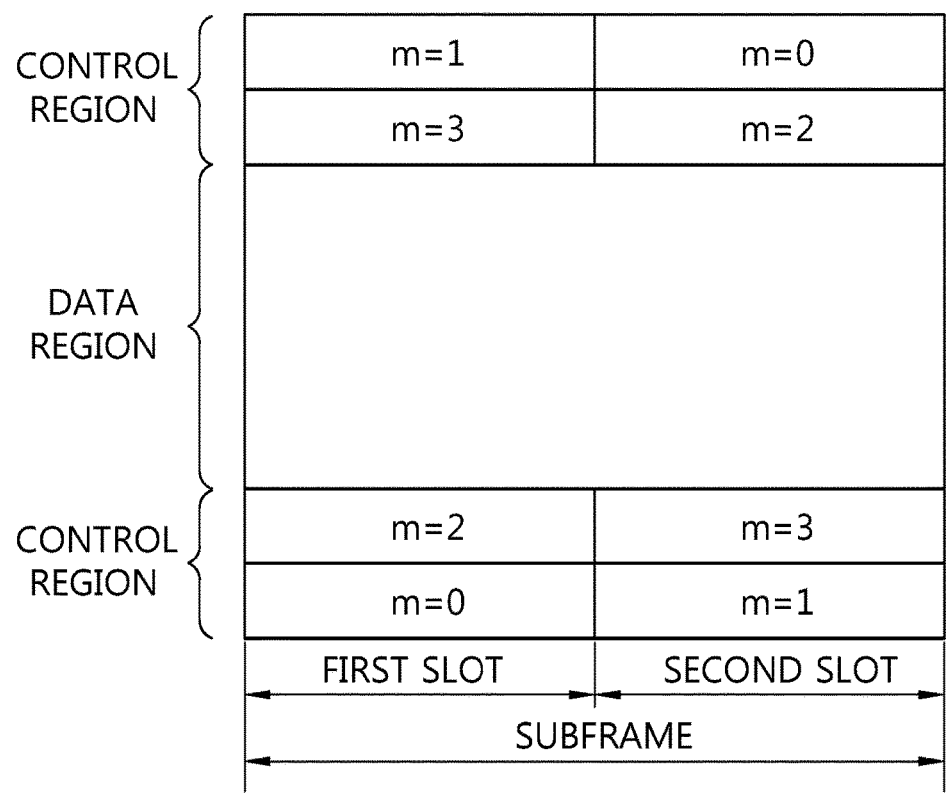
FIG. 5 illustrates the architecture of an uplink subframe in 3GPP LTE.
Figure 5:
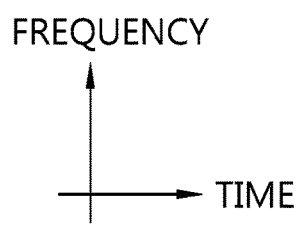

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

Figure 6:
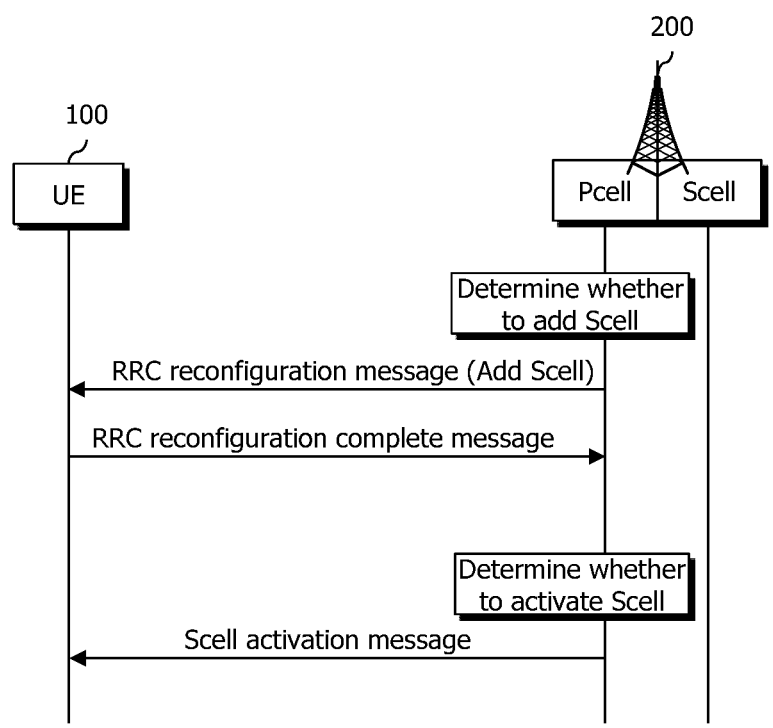
FIG. 6 illustrates the process of adding and activating a secondary cell.

FIG. 6 illustrates the process of adding and activating a secondary cell.

Referring to FIG. 6, the primary cell of the base station 200 transmits a RRC reconfiguration message to the UE 100. A secondary cell (SCell) may be added by the RRC reconfiguration message. Here, FIG. 6 assumes that the primary cell and the secondary cell are in the form of intra-eNodeB, i.e., the form operated by one base station 200.

The UE 100 transmits a RRC reconfiguration complete message to the primary cell in response to the RRC reconfiguration message.

The primary cell determines whether to activate the added secondary cell (SCell). If the activation is needed, the primary cell transmits an activation message to the UE 100.

<Transmission of Uplink Control Information (UCI)>

Uplink control information (UCI) may be transmitted on the PUCCH. In this case, the PUCCH carries various types of control information according to a format. The UCI includes HARQ ACK/NACK, searching request (SR), and channel state information (CSI) indicating a downlink channel state.

Hereinafter, periodic transmission and aperiodic transmission of the CSI will be described.

The CSI as an index indicating a state of a DL channel may include at least any one of a channel quality indicator (CQI) and a precoding matrix indicator (PMI). Further, the CSI may include a precoding type indicator (PTI), a rank indication (RI), and the like.

The CQI provides information, on a link adaptive parameter which the UE may support with respective to a given time. The CQI may be generated by various methods. For example, the various methods includes a method that just quantizes and feeds back the channel state, a method that calculates and feeds back a signal to interference plus noise ratio (SINR), a method that announces a state actually applied to the channel, such as a modulation coding scheme (MCS), and the like. When the CQI is generated based on the MCS, the MCS includes a modulation scheme, a coding scheme and the resulting coding rate. In this case, the base station may determine m-phase shift keying (m-PSK) or m-quadrature amplitude modulation (m-QAM) and coding rate by using the CQI. A table given below shows a modulation scheme, code rate, and efficiency depending on a CQI index. The CQI index shown in the table given below may be expressed as 4 bits.

TABLE 1

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The PMI provides information on a precoding matrix in precoding a codebook base. The PMI is associated with multiple input multiple output (MIMO). In the MIMO, feed-back of the PMI is called closed loop MIMO.

The RI represents information on the number layers recommended by the UE. That is, the RI represents the number of independent streams used in spatial multiplexing. The RI is fed back only when the UE operates in an MIMO mode using the spatial multiplexing. The RI is continuously associated with one or more CQI feed-backs. That is, the CQI which is fed back is calculated assuming a specific RI value. Since a rank of the channel is generally changed more slowly than the CQI, the RI is fed back at the smaller number of times than the CQI. A transmission period of the RI may be multiple of a transmission period of the CQI/PMI. The RI is given with respect all system bands and frequency selective RI feed-back is not supported.

Figure 7A:
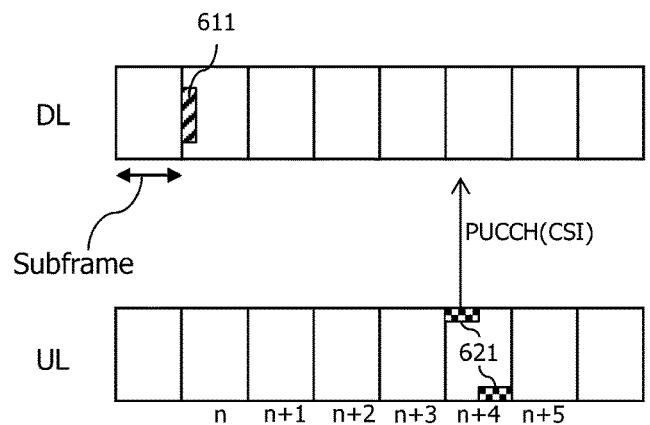
FIG. 7a illustrates one example of periodic CSI reporting in 3GPP LTE.

FIG. 7a illustrates one example of periodic CSI reporting in 3GPP LTE.

As seen with reference to FIG. 7a, the CSI may be periodically transmitted through a PUCCH 621 according to a period determined on a higher layer. That is, the periodic channel state information (CSI) may be transmitted through the PUCCH.

The UE may be semistatically configured by a higher layer signal so as to periodically feed back differential CSIs (CQI, PMI, and RI) through the PUCCH. In this case, the UE transmits the corresponding CSI according to modes defined as shown in a table given below.

TABLE 2

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each transmission mode.

TABLE 3

| Transmission mode | PUCCH CSI reporting modes |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 when PMI/RI reporting is configured for the UE; modes 1-0, 2-0 when the PMI/RI reporting is not configured for the UE |
| Transmission mode 9 | Modes 1-1, 2-1 when the PMI/RI reporting is configured for the UE and the number of CSI-RS ports is larger than 1. modes 1-0, 2-0 when the PMI/RI reporting is not configured for the UE or when the number of CSI-RS ports is 1 |

Meanwhile, a collision of the CSI reports represents a case in which a subframe configured to transmit a first CSI and a subframe configured to transmit a second CSI are the same as each other. When the collision of the CSI reports occurs, the first CSI and the second CSI may be simultaneously transmitted or transmission of a CSI having a lower priority may be dropped (alternatively, abandoned) a CSI having a higher priority may be transmitted according to priorities of the first CSI and the second CSI.

In the case of the CSI report through the PUCCH, various report types may be present as follows according to a transmission combination of the CQI/PMI/RI and period and offset values which are distinguished according to each report type (hereinafter, abbreviated as a type) are supported.

Type 1: Supports the CQI feed-back for a subband selected by the UE.

Type 1a: Supports a subband CQI and a second PMI feed-ack.

Types 2, 2b, 2c: Supports wideband CQI and PMI feed-backs.

Type 2a: Supports the wideband PMI feed-back.

Type 3: Supports an RI feed-back.

Type 4: Transmits a wideband CQI.

Type 5: Supports the RI and wideband PMI feed-back.

Type 6: Supports RI and PTI feed-backs.

Hereinafter, the aperiodic transmission of the CSI will be described.

Figure 7B:
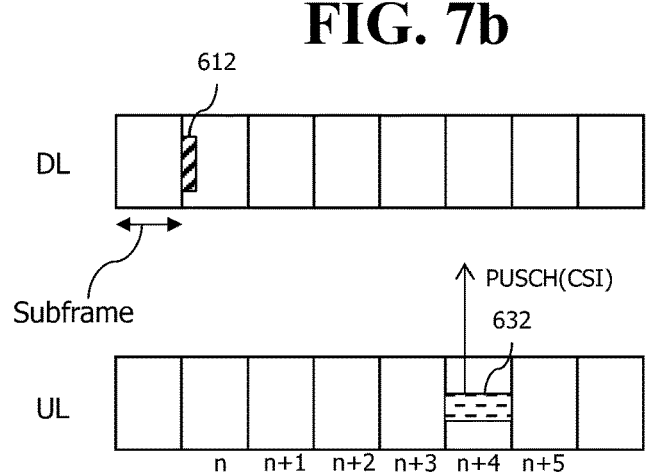
FIG. 7b illustrates one example of aperiodic CSI reporting in the 3GPP LTE.

FIG. 7b illustrates one example of aperiodic CSI reporting in the 3GPP LTE.

A control signal to request the CSI to be transmitted, that is, an aperiodic CSI request signal may be included in a scheduling control signal for the PUSCH transmitted to a PDCCH 612, that is, a UL grant. In this case, the UE aperiodically reports the CSI through a PUSCH 632. As described above, the CSI transmission on the PUSCH is referred to as the aperiodic CSI reporting in that the CSI transmission on the PUSCH is triggered by a request by the base station. The CSI reporting may be triggered by the UL grant or a random access response grant.

In more detail, the wireless device receives the UL grant including scheduling information for the PUSCH 632 to the PDCCH 612 in subframe n. The UL grant may be included in a CQI request field. A table given below shows one example of the CQI request field of 2 bits. A value or a bit count of the CQI request field is just an example.

TABLE 4

| Value of CQI request field | Contents |
|---|---|
| 00 | CSI reporting is not triggered |
| 01 | CSI reporting for a serving cell is triggered |
| 10 | CSI reporting for a first set of the serving cell is triggered |
| 11 | CSI reporting for a second set of the serving cell is triggered |

The base station may announce to the wireless device information on the first and second sets for which the CSI reporting is triggered in advance.

When the CSI reporting is triggered, the wireless device transmits the CSI on a PUSCH 620 in subframe n+k. Herein, k=4 or this is just an example.

The base station may designate a reporting mode (reporting mode) of the CSI for the wireless device.

A table given below illustrates one example of the CSI reporting mode in the 3GPP LTE.

TABLE 5

| | PMI feed-back type | | |
|---|---|---|---|
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2

The precoding matrix is selected on the assumption that DL data is transmitted through only the corresponding subband with respect to each subband. The wireless device assumes the precoding matrix selected with respect to a system band or a band (referred to as a band set S) designated by the higher layer signal and generates the CAI (referred to as the wideband CQI).

The wireless device transmits the CSI including the wideband CQI and the PMI of each subband. In this case, the size of each subband may vary depending on the size of the system band.

(2) Mode 2-0

The wireless device selects M subbands preferred with respect to the system band or the band (the band set S) designated by the higher layer signal. The wireless device generates the subband CQI on the assumption that data is transmitted in selected M subbands. The wireless device additionally generates one wideband CQI with respect to the system band or the band set S.

The wireless device transmits information on the selected M subbands, the subband CQI, and the wideband CQI.

(3) Mode 2-2

The wireless device selects M preferred subbands and a single precoding matrix for M preferred subbands on the assumption of transmitting the DL data through M preferred subbands.

The subband CQIs for M preferred subbands are defined for each codeword. The wireless device generates the wideband CQI with respect to the system band or the band set S.

The wireless device transmits the CSI including M preferred subbands, one subband CQI, PMIs for M preferred subbands, the wideband PMI, and the wideband CQI.

(4) Mode 3-0

The wireless device transmits the CSI including the wideband CQI and the subband CQI for the configured subband.

(5) Mode 3-1

The wireless device generates the single precoding matrix with respect to the system band or the band set S. The wireless device assumes the generated single precoding matrix and generates the subband CQI for each codeword. The wireless device may assume the single precoding matrix and generate the wideband CQI.

Hereinafter, simultaneous transmission of the PUCCH and the PUSCH will be described.

In a 3GPP release 8 or release 9 system, when the UE uses an SC-FDMA scheme in uplink transmission, the UE may not be allowed to simultaneously transmit the PUCCH and the PUSCH on one carrier in order to maintain a single carrier characteristic.

However, in a 3GPP release 10 system, whether to simultaneously transmit the PUCCH and the PUSCH may be indicated on a higher layer. That is, according to the indication of the higher layer, the UE may simultaneously transmit the PUCCH and the PUSCH or transmit only any one of the PUCCH and the PUSCH.

Figure 7C:
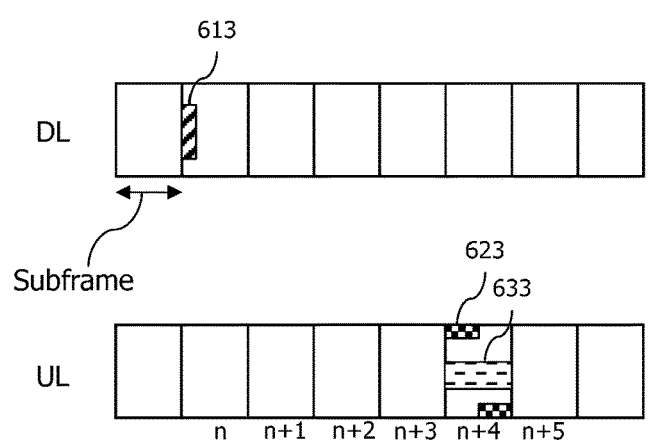
FIG. 7c illustrates one example of simultaneous transmission of PUCCH and PUSCH.

FIG. 7c illustrates one example of simultaneous transmission of PUCCH and PUSCH.

As seen with reference to FIG. 7c, the UE receives PDCCH 613 in the subframe n.

In addition, the UE may simultaneously transmit PUCCH 623 and PUSCH 633 in for example, a subframe n+4.

The simultaneous transmission of the PUCCH and the PUSCH is defined as follows in the 3GPP release 10 system.

It is assumed that the UE is configured for a single serving cell and the PUSCH and the PUCCH are configured not to be simultaneously transmitted. In this case, when the UE does not transmit the PUSCH, the UCI may be transmitted through PUCCH format 1/1a/1b/3. The UE transmits the PUSCH and when the PUSCH does not correspond to a random access response grant, the UCI may be transmitted through the PUSCH.

Unlike this, it is assumed that the UE is configured for the single serving cell and the PUSCH and the PUCCH are configured to be simultaneously transmitted. In this case, when the UCI is constituted only by HARQ-ACK and SR, the UCI may be transmitted through the PUCCH format 1/1a/1b/3. However, when the UCI is constituted only by the periodic CSI, the UCI may be transmitted on the PUCCH through PUCCH format 2. Alternatively, when the UCI is constituted by the periodic CSI and the HARQ-ACK and the UE does not transmit the PUSCH, the UCI may be transmitted on the PUCCH through PUCCH format 2/2a/2b. Alternatively, when the UCI is constituted only by HARQ-ACK/NACK, the UCI is constituted by the HARQ-ACK/NACK and the SR, the UCI is constituted by positive SR and the periodic/aperiodic CSI, or when the UCI is constituted only by the aperiodic CSI, the HARQ-ACK/NACK, the SR, and the positive SR may be transmitted to the PUCCH and the periodic/aperiodic CSI may be transmitted through the PUSCH.

Further, unlike this, it is assumed that the UE is configured for one or more serving cells and the PUSCH and the PUCCH are configured not to be simultaneously transmitted. In this case, when the UE does not transmit the PUSCH, the UCI may be transmitted onto the PUCCH according to the PUCCH format 1/1a/1b/3. However, when the UCI is constituted by the aperiodic CSI or when the UCI is constituted by the aperiodic CSI and the HARQ-ACK, the UCI may be transmitted through the PUSCH of the serving cell.

Alternatively, when the UCI is constituted by the periodic CSI and the HARQ-ACK/NACK and the UE does not transmit the PUSCH in the subframe n of a primary cell, the UCI may be transmitted on the PUSCH.

Further, unlike this, it is assumed that the UE is configured for one or more serving cells and the PUSCH and the PUCCH are configured to be simultaneously transmitted. In this case, when the UCI is constituted by at least one of the HARQ-ACK and the SR, the UCI may be transmitted on the PUCCH through the PUCCH format 1/1a/1b/3. However, when the UCI is constituted only by the periodic CSI, the UCI may be transmitted onto the PUCCH by using the PUCCH format 2. Alternatively, when the UCI is constituted by the periodic CSI and the HARQ-ACK/NACK and the UE does not transmit the PUSCH, the CSI may not be transmitted but dropped (alternatively, abandoned). Alternatively, when the UCI is transmitted to the HARQ-ACK/NACK and the periodic CSI and the UE transmits the PUSCH on the subframe of the primary cell, the HARQ-ACK/NACK may be transmitted on the PUCCH by using the PUCCH format 1a/1b/3 and the periodic CSI may be transmitted on the PUSCH.

Figure 8:
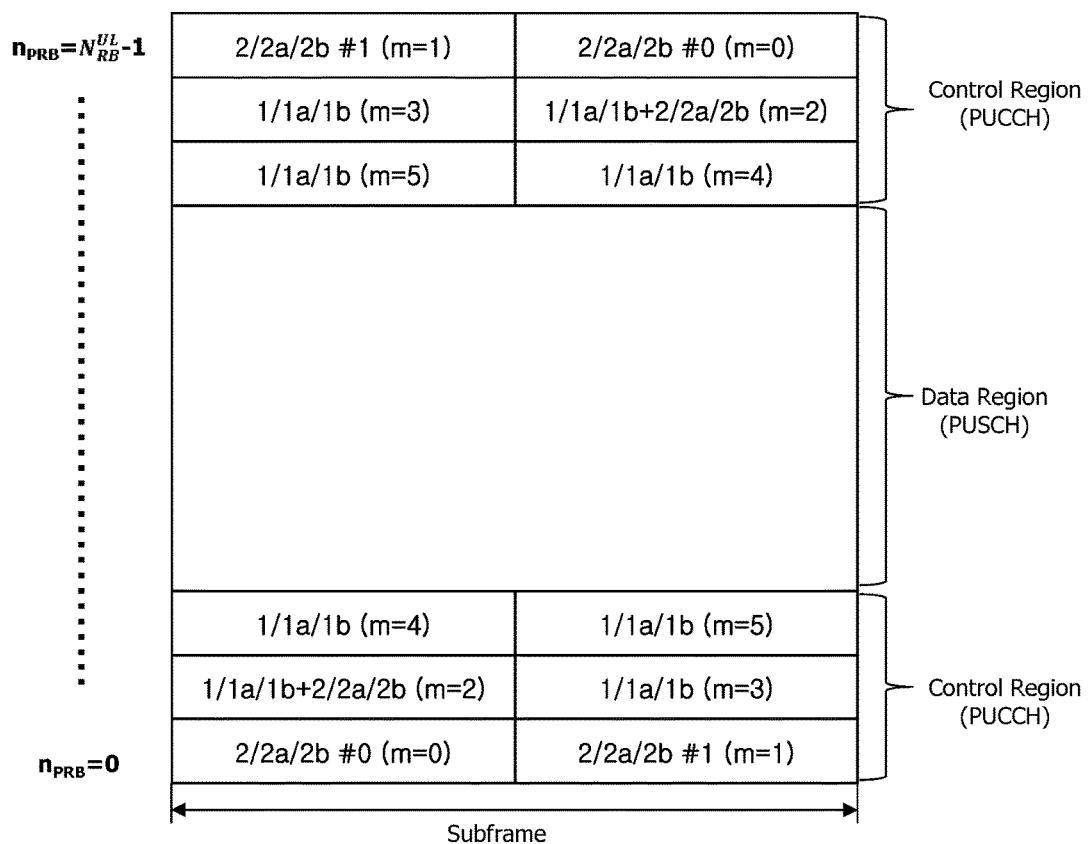
FIG. 8 illustrates the PUCCH and the PUSCH on an uplink subframe.

FIG. 8 illustrates the PUCCH and the PUSCH on an uplink subframe.

PUCCH formats will be described with reference to FIG. 8.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 6

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

Meanwhile, the PUSCH is mapped to an uplink shared channel (UL-SCH) which is a transport channel. Uplink data transmitted onto the PUSCH may be a transport block which is a data block for the UL-SCH during a TTI. The transport block may include user data. Alternatively, the uplink data may be multiplexed data. The multiplexed data may be obtained by multiplexing the transport block and the channel state information for the uplink shared channel (UL-SCH). For example, the channel state information (CSI) multiplexed to data may include the CQI, the PMI, the RI, and the like. Alternatively, the uplink data may be constituted only by the channel state information. The periodic or aperiodic channel state information may be transmitted through the PUSCH.

The PUSCH is assigned by the UL grant on the PDCCH. Although not illustrated in FIG. 7, a fourth OFDM symbol of each slot of a normal CP is used in transmission of a demodulation reference signal (DM RS) for the PUSCH.

<Introduction of Small Cell>

Meanwhile, in a next-generation mobile communication system, it is anticipated that a small cell having a small cell coverage radius will be added into coverage of the existing cell and it is anticipated that the small cell will process more traffic. Since the existing cell has larger than the small cell, the existing call may be called a macro cell. Hereinafter, the macro cell will be described with reference to FIG. 10.

Figure 9:
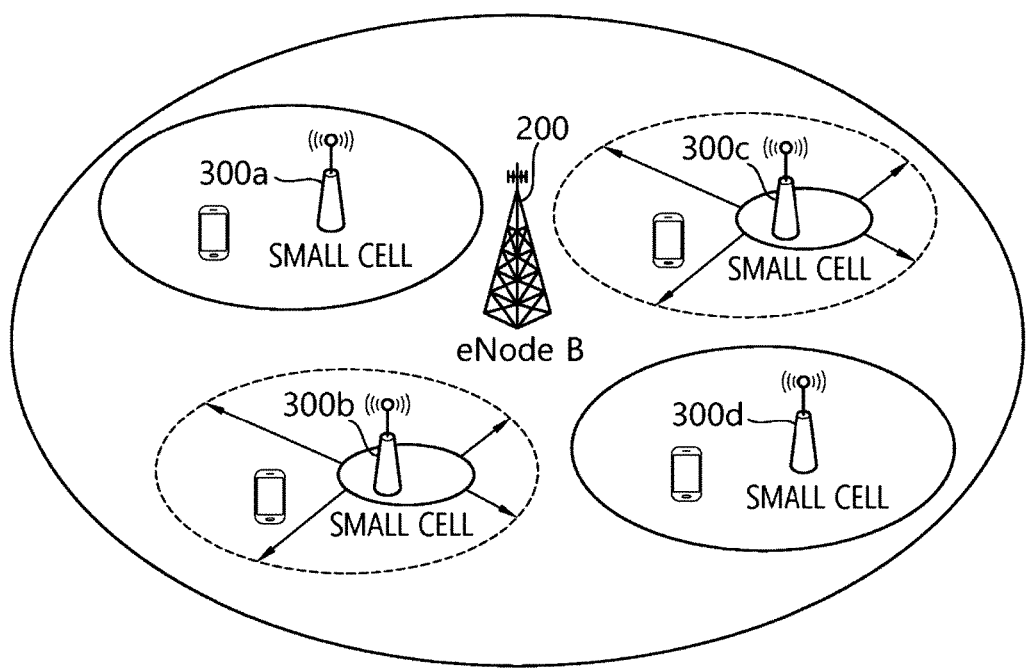
FIG. 9 is a diagram illustrating an environment of heterogeneous networks of a macro cell and a small cell which may become a next-generation wireless communication system.

FIG. 9 is a diagram illustrating an environment of heterogeneous networks of a macro cell and a small cell which may become a next-generation wireless communication system.

Referring to FIG. 9, a heterogeneous-network environment is shown, in which a macro cell by the existing base station 200 overlaps with a small cell by one or more small base stations 300a, 300b, 300c, and 300d. Since the existing base station provides the larger coverage than the small base station, the existing base station may be called the macro base station (macro eNodeB, MeNB). In the present specification, terms such as the macro cell and the macro base station will be mixed and used. The UE that accesses the macro cell 200 may be called macro UE. The macro UE receives a downlink signal from the macro base station and transmits an uplink signal to the macro base station.

In the heterogeneous networks, the macro cell is configured as a primary cell (Pcell) and the small cell is configured as a secondary cell (Scell) to fill a coverage gap of the macro cell. Further, the small cell is configured as the primary cell (Pcell) and the macro cell is configured as the secondary cell (Scell) to boost overall performance.

Meanwhile, the small cell may use a frequency band assigned to current LTE/LTE-A or use a higher frequency band (e.g., a band of 3.5 GHz or higher).

On the other hand, in a next LTE-A system, it is considered that the small cell may not be independently used and the small cell may be used only as a macro-assisted small cell which may be used under assistance of the macro cell.

The small cells 300a, 300b, 300c, and 300d may have similar channel environments to each other and since the small cells 300a, 300b, 300c, and 300d are positioned at distances which are proximate to each other, interference among the small cells may be large.

In order to reduce an interference influence, the small cells 300b and 300c may extend or reduce coverage thereof. The extension and reduction of the coverage is referred to as cell breathing. For example, as illustrated in FIG. 8, the small cells 300b and 300c may be turned on or off according to a situation.

On the other hand, the small cell may use the frequency band assigned to the current LTE/LTE-A or use the higher frequency band (e.g., a band of 3.5 GHz or higher).

<Introduction of Dual Connectivity>

Recently, a scheme in which the UE may be connected simultaneously to different base stations, e.g., the base station of a macro cell and the base station of a small cell is currently studied. This scheme is called dual connectivity.

Scenarios enabling the dual connectivity are showed in FIG. 9a through 9b.

Figure 10A:
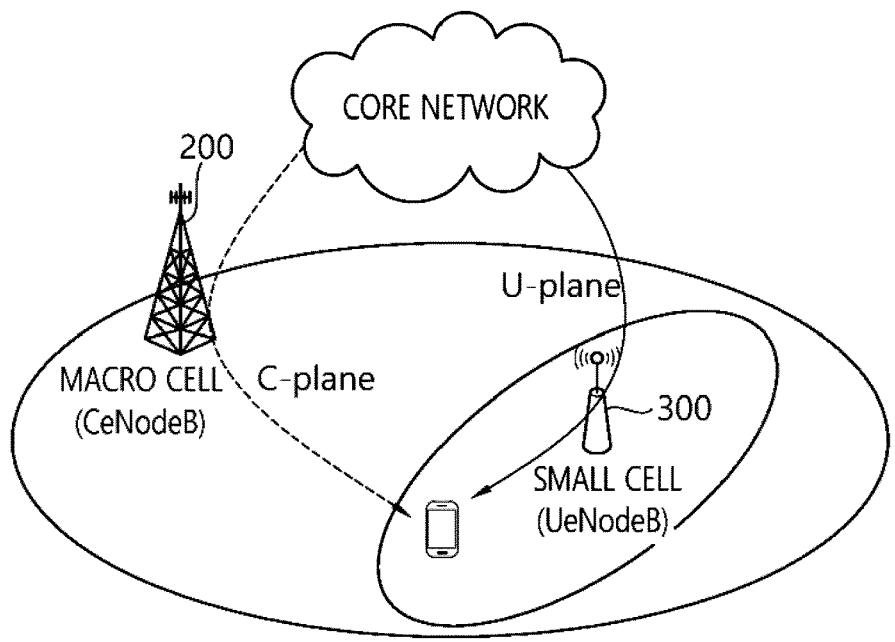
FIGS. 10*a* and 10*b* illustrate scenarios of dual connectivity possible with respect to the macro cell and the small cell.
Figure 10B:
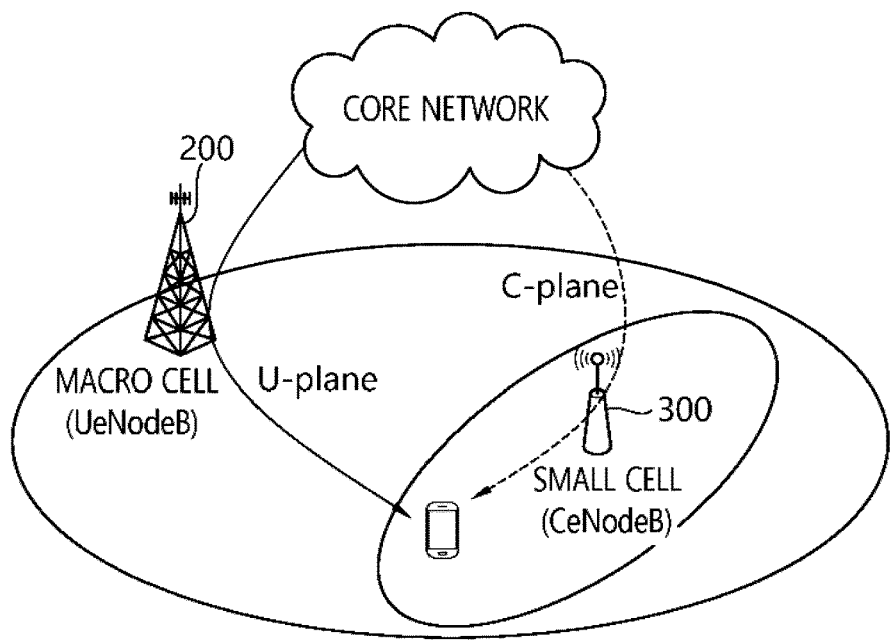

FIGS. 10a and 10b show scenarios of dual connectivity for a macro cell and a small cell.

As illustrated in FIG. 10a, the macro cell may be set as a control-plane (hereinafter, "C-plane") and the small cell may be set as a user-plane (hereinafter, "U-plane") in the UE.

Further, as illustrated in FIG. 10b, the small cell may be set as C-plane and the macro cell may be set as U-plane in the UE. In the present specification, the cell of C-plane is called a C-cell and the cell of U-plane is called U-cell for the convenience of description.

Here, the mentioned C-plane means supporting RRC connection setting and resetting, RRC idle mode, mobility including a handover, cell selection, reselection, HARQ process, setting and resetting of carrier aggregation (CA), a procedure needed for RRC configuration, a random access procedure and the like. Further, the mentioned U-plane means supporting a data processing of an application, CSI report, HARQ process for application data, a multicasting/broadcasting service and the like.

From the perspective of the UE, the setting of C-plane and U-plane is as follows. The C-cell may be set as a primary cell, and the u-cell may be set as a secondary cell. On the contrary, the U-cell may be set as a primary cell, and the C-cell may be set as a secondary cell. Further, the C-cell may be separately processed in a special manner, and the U-cell may be set as a primary cell. Further, both the C-plane and the U-cell may be set as the primary cell. Yet, it is assumed in the present specification that the C-cell is set as the primary cell and the U-cell is set as the secondary cell for the convenience of description.

Meanwhile, in the situation that the UE 100 frequently moves a short distance, a handover may very frequently occur, and thus in order to prevent the handover, it may be advantageous that the macro cell is set as the C-cell or the primary cell and the small cell is set as U-cell or the secondary cell in the UE.

For such a reason, the macro cell may always be connected to the UE as the primary cell of the UE.

Meanwhile, FIGS. 10a and 10b illustrate that the UE is dually connected to the eNodeB of the macro cell and the eNodeB of the small cell, but the present invention is not limited thereto. For example, the UE may be dually connected to the first eNodeB for the first small cell (or the group of first small cells) and the second eNodeB for the second small cell (or the group of second small cells).

Considering all of the above examples, the eNodeB for the primary cell (Pcell) may be called a master eNodeB (hereinafter, "MeNB"). Further, the eNodeB for the secondary cell may be called a secondary eNodeB (hereinafter, "SeNB").

The cell group including the primary cell by the MeNB may be called a master cell group (MCG) or PUCCH cell group 1, and the cell group including the secondary cell by the SeNB may be called a secondary cell group (SCG) or PUCCH cell group 2.

Meanwhile, among secondary cells in the secondary cell group (SCG), a secondary cell in which the UE can transmit UCI or a secondary cell in which the UE can transmit PUCCH may be called a super secondary cell (super SCell) or a primary secondary cell (PScell).

Figure 11:
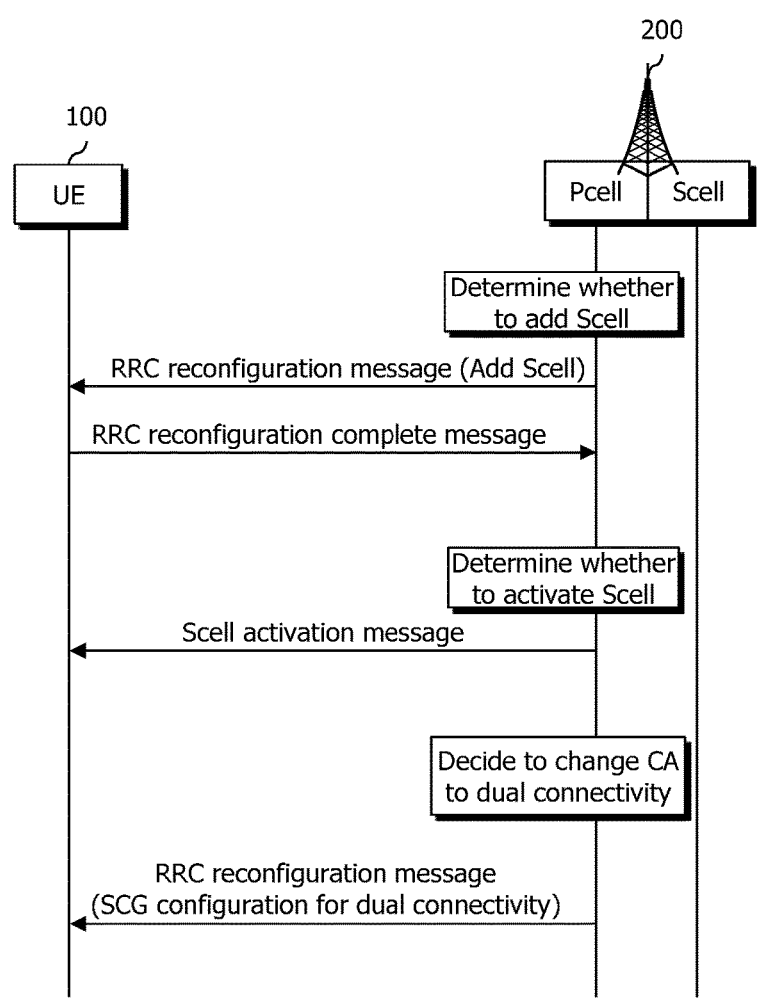
FIG. 11 illustrates an example of deciding to change carrier aggregation (CA) to dual connectivity.

FIG. 11 illustrates an example of deciding to change carrier aggregation (CA) to dual connectivity.

As illustrated in FIG. 11, the carrier aggregation (CA) has been set in the UE 100. Namely, the primary cell (Pcell) of the base station 200 has added and activated the secondary cell (Scell) for the UE 100.

However, in such a situation, the base station 200 decides to change the carrier aggregation (CA) to the dual connectivity. For example, if the base station 200 attempts offloading the PUCCH transmission of the UE to the secondary cell, the secondary cell of the carrier aggregation (CA) should be changed to the primary secondary cell (PSCell) of the dual connectivity.

As such, the base station 200 transmits a RRC connection reconfiguration message. The RRC connection reconfiguration message includes SCG setting. According to the SCG setting, the secondary cell (Scell) of the base station 200, which has been set by the carrier aggregation (CA), may be designated as the primary secondary cell (PSCell) of the SCG by dual connectivity. Further, according to the SCG setting, another cell of the base station 200, which has not been set by the carrier aggregation (CA), may be designated as the primary secondary cell (PSCell) of the SCG by dual connectivity.

However, the technical ambiguity between the base station 200 and the UE 100 may be generated during the section in which the carrier aggregation (CA) is switched to dual connectivity.

<Disclosure of the Present Specification>

First, the disclosure of the present specification presents a scheme of applying a dual connectivity technology designed in consideration of base stations at different geographical locations to the carrier aggregation (CA) technology operated by one base station. According to this scheme, when the PUCCH resource of a primary cell (PCell) is not sufficient, the whole or partial PUCCH transmission of UEs may be detoured to a specific secondary cell (SCell).

Meanwhile, the secondary cell group (SCG) including PSCell capable of PUCCH at the time of switching to dual connectivity in the CA in the UE may be selected among cells included in the already-set carrier aggregation (CA) and may also be selected among cells other than the cells included in the CA.

In the former case, the technical ambiguity between the base station and the UE may occur as the method of generating the UCI and the cell in which the UE transmits PUCCH in the process of switching to dual connectivity in the CA in the UE, and thus a fallback mode therefor may need to be defined. Further, when the carrier aggregation, which is set in the UE, is switched to dual connectivity, the cell, which may be included in the SCG, and the cell, which may be selected as pSCell, may not be a cell which is set in the UE or is activated. Specifically, according to the dual connectivity technology, pSCell is set in the UE and at the same time, is activated, and thus the cell, which may be designated as pSCell in the UE where the CA has been set, should be a cell which is not currently set in the UE. If one of the cells which have been set in the UE is tried to be designated as pSCell, a RRC parameter, etc. may be inherited through a new command (or the existing command). For example, ScellChange_to_pSCell, etc. may be considered. If the existing command/procedure is used, when a plurality of cells are included in the SCG, this corresponds to a command/procedure of changing one of the cells to pSCell. The scheme may consider including the process of secondary cell release or deactivation of cells (including pSCell) which become the subject of SCG among cells which have been set in the corresponding UE before the switch to the dual connectivity by the UE.

The operation, which needs to be performed during the reconfiguration section for switching to the dual connectivity in the CA by the UE, is proposed below. The scheme includes a preliminary process method for sets which have been set as the carrier aggregation (CA) and an UE operation method during the change section.

I. Secondary Cell (Scell) Release/Deactivation Method

When some of the cells included in the CA are configured as the SCG of dual connectivity, a technical ambiguity between the base station and the UE may occur between the base station and the UE for the cell where the UE transmits the PUCCH or the method of generating the UCI by the UE during the corresponding change section. In order to prevent such an ambiguity, it may be considered to perform a preliminary process for the whole or part of the cells in the process of switching to the dual connectivity. The following is a specific example for the preliminary process at the time of switching to dual connectivity in the CA.

As a first example, a release is performed for the secondary cell (SCell) which has been set as the carrier aggregation (CA). Namely, in this case, before the switch to dual connectivity, the UE regards only the primary cell (PCell) as the serving cell.

As a second example, deactivation is performed for the secondary cell (SCell) which has been set as the carrier aggregation (CA).

As a third example, a release is performed for cells to be added to the SCG among secondary cells (SCell) which have been set as the carrier aggregation (CA). The corresponding release operation may influence the HARQ-ACK operation related to the CA performed by the UE. Further, it may be considered to deactivate cells not belonging to the SCG (e.g., cells belonging to the MCG).

As a fourth example, the cells added to the SCG among secondary cells set as the CA may be deactivated. In this case, the cells not belonging to the SCG (e.g., the cells belonging to the MCG) may be in the activated stated or in the deactivated state. In this case, it is assumed that the HARQ-ACK (e.g., PUCCH format 3) transmitted by the UE to the MCG does not includes HARQ-ACK bit for the cells included in the SCG. Further, the UE readjusts SCellIndex according to the index allocated in the SCG.

As a fifth example, at the point of time of directing designation or addition of MCG/SCG or at the point of time of subframe prior to the directing point of time, the base station indicates the reconfiguration section to the UE and configures the UE not to perform the operation related to the PUCCH transmission and UCI transmission.

The above preliminary process may be performed at the point of time after the subframes of a certain number (e.g., 8) from the subframe having received the message related to dual connectivity (e.g., the message related to the MCG/SCG addition/correction, etc.) or may be promptly performed at the subframe having received the message.

II. Method of Operating a Fallback Mode during MCG/SCG Configuration Section

II-1. Method of Transmitting UCI

In the case of HARQ-ACK, when only the primary cell (PCell) performs a scheduling operation, only the HAQR-ACK for the primary cell (PCell) may be transmitted through the PUCCH of the primary cell (PCell), and in the process of switching to the dual connectivity in the CA, the fallback mode may be defined in the same manner. Further, in the HARQ-ACK transmission during the section of switching to the dual connectivity in the CA, in the case of the PUCCH, it may be considered that the HARQ-ACK for all cells is transmitted through the primary cell (PCell) irrespective of MCG/SCG. In this case, at least the HARQ-ACK corresponding to the SCG may be processed as the DTX or as NACK. Further, when setting the PUCCH transmission power, only the number of HARQ-ACK bits corresponding to the MCG may be considered. In the case of the PUSCH, the performance of the UCI piggyback may be limited to the PUSCH to be transmitted to the cells corresponding to the MCG during the section of switching to dual connectivity in the CA.

In the case of the aperiodic CSI/SRS transmission, the transmission error by the technical ambiguity between the base station and the UE may be avoided as the base station does not transmit the corresponding triggering message to the UE. In the case that the aperiodic CSI/SRS triggering message is received from the point of time after the subframes of a certain number (e.g., 8) from the subframe having received the SCG addition/correction information, the following scheme may be considered.

As a first scheme, the UE disregards the corresponding information and does not transmit any UL channel.

As a second scheme, the UE transmits CSI or SRS in the form that is set in the upper layer irrespective of MCG/SCG.

As a third scheme, the UE may transmit CSI/SRS only when the transmission cell is a cell corresponding to the MCG. Specifically, in the case of the aperiodic CSI, the UE may not transmit a CSI corresponding to the SCG. Namely, when the cell, which becomes the subject of the aperiodic CSI, is set as the combination of the serving cell belonging to the MCG by the upper layer and the serving cell belonging to the SCG, the CSI for the serving cell belonging to the MCG may be configured and transmitted.

In the case of the periodic CSI/SRS transmission, as described above, the CSI and/or SRS for the whole or part of the cells may not be transmitted through the preliminary process, and in the activated state, a process for solving the technical ambiguity issue may be performed. The following is an example of a specific scheme for the periodic CSI/SRS process in the section of switching to dual connectivity in the CA.

As a first illustrative scheme, when the set secondary cell is in the activated state, the UE stops the transmission of the periodic CSI and/or SRS for all secondary cells from the point of time after the subframes of a certain number (e.g., 8) from the point of receiving a message related to the SCG addition/correction.

As a second illustrative scheme, in the case that the set secondary cell is in the activated state, the UE stops the periodic CSI and/or SRS transmission for the secondary cell belonging to the SCG from the point of time after the subframes of a certain number (e.g., 8) from the point of time of receiving the message related to SCG addition/ correction. At this time, the UE may transmit the CSI for the serving cell belonging to the MCG through the PUCCH of the primary cell.

As a third illustrative scheme, in the case that the set secondary cell is in the activated state, the UE transmits the CSI for the corresponding cells through the PUCCH or PUSCH (including UCI) of the primary cell. The base station may disregard the whole or partial periodic CSI during the switch section to the dual connectivity. Specifically, the some CSI reports may correspond to the SCG.

The stopped periodic CSI report and periodic SRS transmission may be resumed only after the subframes of a certain number (e.g., 8) from the subframe having received the cell activation message or reconfiguration complete message from the MCG/SCG.

The PRACH may be inefficient at the time of switching to the dual connectivity in the CA, and thus it may be omitted in the process of setting the SCG. With respect to whether to transmit the PARCH to the SCG, informing the UE may be considered in the procedure of setting the dual connectivity (SCG addition/correction procedure, etc.). Further, the base station may indicate whether not to transmit PARCH or through signaling to the UE only when the primary secondary cell is selected among the cells selected for the CA.

II-2. TPC (Transmit Power Control) Setting Method

There may be a TPC for PUCCH and a TPC for PUSCH. The TPC for PUCCH was designated through (E)PDCCH which is DCI format 1A/1B/1D/1/2A/2/2B/2C/2D received from the primary cell. Alternatively, it was designated through DCI format 3/3A scrambled as TPC-PUCCH-RNTI. The TPC for PUSCH for each serving cell was designated through (E)PDCCH for each corresponding serving cell which is DCI format 0/4 and was additionally designated through DCI format 3/3A which is scrambled with TPC-PUSCH-RNTI.

The TPC value for the PUSCH was designated per serving cell, and thus inheriting the corresponding value at the time of switching to dual connectivity may be considered and resetting to 0 as a means of reconfiguration may also be considered. The following is a specific example for TPC setting of PUCCH and PUSCH for MCG.

As a first example, PUCCH/PUSCH TPC value, which has been set by the CA, may be maintained at the time of switching to the dual connectivity.

As a second example, the PUCCH TPC value which has been set by the CA at the time of switching to dual connectivity is maintained, and the PUSCH TPC value is reset. The reset may be setting to 0 or may be expressed as the function the lastly succeeded power at the time of PRACH transmission.

As a third example, the PUSCH TPC value, which has been set by the CA at the time of switching to dual connectivity, is maintained, and the PUCCH TPC value is reset. The reset may be to reset to 0.

As a fourth example, PUCCH/PUSCH TCP values, which have been set by the CA, are reset at the time of switching to dual connectivity. Here, the reset may be setting to 0 or may be expressed as the function of the lastly succeeded power at the time of PRACH transmission.

The TPC transmitted by the base station at the switch section to the dual connectivity may be disregarded by the UE or may be utilized for TPC update. Each scheme may be differently set for PUCCH and PUSCH.

The following is a specific example of TPC setting of PUCCH and PUSCH.

As a first example, the PUSCH TPC value, which has been set by CA, may be maintained at the time of switching to dual connectivity. For example, the primary cell PUCCH TPC value, which has been set by the carrier aggregation, may be used as PUCCH TPC value for pSCell by inheriting the PUCCH TPC value.

As a second example, the primary cell PUCCH TPC value, which has been set by the CA, is utilized as pSCell PUCCH TPC value, and the PUSCH TPC value is reset. The reset may be setting to 0 or may be expressed as the function of the lastly succeeded power at the time of PRACH transmission.

As a third example, the PUSCH TPC value, which has been set by the CA, is maintained even at the switch to the dual connectivity, and the PUCCH TPC value may be reset. The reset may be setting to 0.

As a fourth example, if switched to the dual connectivity, PUCCH/PUSCH TPC values, which have been set by the CA, are reset. The reset may be to set to 0 or may be expressed as the function of the lastly succeeded power at the time of transmitting the PRACH.

Here, the UE may disregard the TPC transmitted by the base station during the section of the switch to the dual connectivity and may be utilized for TPC update. Each scheme may be differently set for PUCCH and PUSCH. Here, when the value for PUCCH transmission to the primary cell is inherited for PUCCH transmission to pSCell and is used, inheriting $P_{O\_PUCCH}$, $\Delta_{F\_PUCCH}(F)$, $\Delta_{TxD}(F')$ may be considered. Specifically, the same value as the value for PUCCH transmission to the primary cell may be transmitted again for PUCCH transmission. Such a transmission may be performed through the upper layer signal.

II-3. RRC Reconfiguration Method

The pathloss standard or the whole or part of RRC configuration may be maintained at the time of switching to dual connectivity in the CA. Yet, among cells belonging to the SCG, RRC configuration for pSCell may be changed. Likewise, in the situation that the RRC configuration is maintained, the transmission of the corresponding RRC (re)configuration message may be omitted in the process of switching to dual connectivity. In this case, the UE may consider maintaining the RRC configuration information for each serving cell so as to be used. For example, when switched to the dual connectivity in the CA, the configuration used for the secondary cell of the CA, such as the pathloss criterion, timing criterion, TA command, TM, PDSCH setting, CSI report setting, PUSCH setting, PRACH setting and the like may be maintained for the secondary cell belonging to the SCG. Yet, when the change message is not received, the UE may use the configuration used for the secondary cell of the CA.

Here, inheriting the TA command may mean inheriting the TA value based on the primary cell (PCell) in the case that the multiple TAG is not set in the CA, and when the multiple TAG is set, it may be understood as inheriting the TA value of the PTAG or STAG according to the TAG to which the corresponding cell belongs. In the case of PUCCH configuration, when there is no setting value for the SCG, inheriting the PUCCH configuration for the primary cell so as to be used may be considered. Alternatively, in the situation that is maintained same, delivering the same value to the UE again through RRC (re)configuration may be considered.

Exceptionally, when the cross-carrier scheduling scheme is used in the CA, the scheduling cell and the scheduled cell may not belong to the same CG after switching to the dual connectivity. Hence, the currently scheduled cell may be self-scheduled again at the time of switching to the dual connectivity. Further, when the scheduling cell is switched to the dual connectivity, it may be designated as the primary cell of the MCG or the pSCell of the SCG.

Exceptionally, even if the simultaneous transmission scheme of the PUCCH and the PUSCH is not set in the CA, it may be changed to support the PUCCH simultaneous transmission and PUCCH and PUSCH simultaneous transmission respectively corresponding to different CGs at the time of switching to dual connectivity. For example, in the CA situation, when the PUCCH and the PUSCH are not simultaneously transmitted, the PUCCH corresponding to the MCG and the PUSCH corresponding to the SCG may be simultaneously transmitted at the time of switching to dual connectivity. Further, it may be assumed that the UE, which may be switched to the dual connectivity, is a UE capable of setting at least simultaneous transmission of PUCCH and PUSCH.

Exceptionally, the TA command may be differently set depending on the TDD-FDD combination. When the TDD-based cell and the FDD-based cell belong to the same STAG in the TDD-FDD carrier aggregation of the next system, the UE has set $N_{TA}$ offset value as 624 Ts. In the CA situation, when switched to dual connectivity, the corresponding TA value may inherit the value which is set in the CA situation.

Further, When 1) after the switch to dual connectivity, STA includes only FDD cells, 2) FDD cells having been included in the STAG are enabled to be included in the SCG, 2-1) the corresponding cell does not correspond to the multiple TAG, 2-2) the cell belongs to the STAG including only FDD cells, or 2-3) the cell belongs to the TAG including pSCell, $N_{TA}$ may be set to 0 again.

Exceptionally, in the case of PRACH configuration, information on the corresponding cell may be transmitted to the UE again. The UE may perform a random access procedure or transmit a SR (scheduling request) based on the corresponding information.

The above-described embodiments of the present invention may be implemented through various means. For example, the embodiments of the present invention may be implemented by hardware, firmware, software or a combination thereof. Specifically, the embodiments are described with reference to the drawings.

Figure 12:
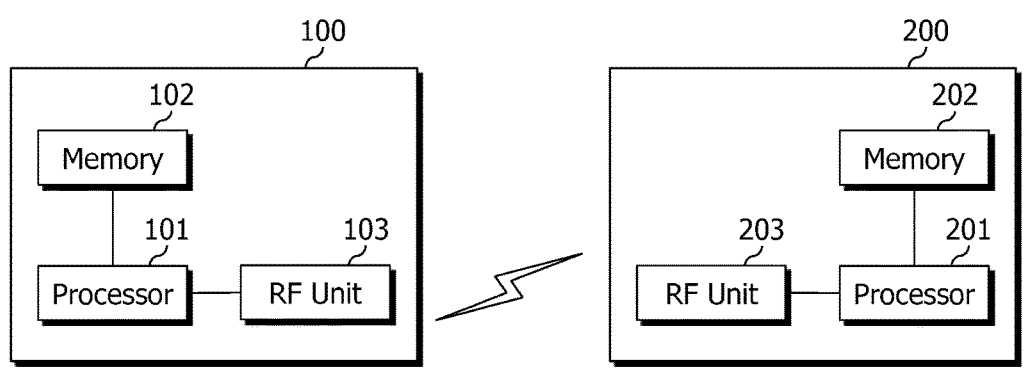
FIG. 12 is a block diagram of a wireless communication system in which the disclosure of the present specification is implemented.

FIG. 12 is a block diagram of a wireless communication system in which the disclosure of the present specification is implemented.

A base station 200 includes a processor 201, a memory 202, and a RF unit 203. The memory 202 is connected to the processor 201 and stores various informations for driving the processor 201. The RF unit 203 is connected to the processor 201 and transmits and/or receives a wireless signal. The processor 201 implements the proposed function, process, and/or method. In the above-described embodiments, the operation of the base station 200 may be implemented by the processor 201.

A UE includes a processor 101, a memory 102, and an RF unit 103. The memory 102 is connected to the processor 101 and stores various informations for driving the processor 101. The RF unit 103 is connected to the processor 101 and transmits and/or receives a wireless signal. The processor 101 implements the proposed function, process and/or method.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of switching to dual connectivity in carrier aggregation, the method performed by a user equipment (UE) and comprising:
    applying, by the UE, configuration information to a second cell which is configured by a first cell for a carrier aggregation;
    receiving, by the UE from a base station, a message including a request for switching the second cell from the carrier aggregation to dual connectivity;
    performing a procedure for the switching of the second cell from the carrier aggregation to the dual connectivity;
    maintaining, by the UE, the configuration information, which has been applied for the carrier aggregation, thereby being applied to the second cell for the dual connectivity,
    wherein after the switching of the second cell from the carrier aggregation to the dual connectivity, the second cell becomes a primary secondary cell or a secondary cell of a secondary cell group (SCG); and
    transmitting a physical uplink control channel (PUCCH) to the primary secondary cell or the secondary cell of the SCG after the switching of the second cell from the carrier aggregation to the dual connectivity.

2. The method of claim 1, wherein the configuration information comprises at least one selected from the group consisting of a pathloss criterion, a timing criterion, a timing advance (TA) command, a transmission mode (TM), a physical downlink shared channel (PDSCH) setting, a channel state information (CSI) report setting, a physical uplink shared channel (PUSCH) setting, and a physical random access channel (PRACH) setting.

3. The method of claim 1, further comprising:
    deactivating the second cell which is configured for the carrier aggregation before the switching of the second cell from the carrier aggregation to the dual connectivity.

4. A user equipment comprising:
    a transceiver; and
    a processor configured to:
        apply configuration information to a second cell which is configured by a first cell for a carrier aggregation,
        control the transceiver to receive, from a base station, a message including a request for switching the second cell from the carrier aggregation to dual connectivity, perform a procedure for the switching of the second cell from the carrier aggregation to the dual connectivity, maintain the configuration information, which has been applied for the carrier aggregation, thereby being applied to the second cell for the dual connectivity after the switching to the dual connectivity, wherein after the switching of the second cell from the carrier aggregation to the dual connectivity, the second cell becomes a primary secondary cell or a secondary cell of a secondary cell group (SCG), and wherein after the switching of the second cell from the carrier aggregation to the dual connectivity, the second cell becomes a primary secondary cell or a secondary cell of a secondary cell group (SCG), and control the transceiver to transmit a physical uplink control channel (PUCCH) to the primary secondary cell or the secondary cell of the SCG after the switching of the second cell from the carrier aggregation to the dual connectivity.

5. The user equipment of claim 4, wherein the configuration information comprises at least one selected from the group consisting of a pathloss criterion, a timing criterion, a timing advance (TA) command, a transmission mode (TM), a physical downlink shared channel (PDSCH) setting, a channel state information (CSI) report setting, a physical uplink shared channel (PUSCH) setting, and a physical random access channel (PRACH) setting.

6. The user equipment of claim 4, wherein the processor is further configured to:

deactivate the second cell which is configured for the carrier aggregation before the switching of the second cell from the carrier aggregation to the dual connectivity.

\* \* \* \* \*